(12) United States Patent
Callway (10) Patent No.: US 7,978,915 B2
(45) Date of Patent: Jul. 12, 2011

(54) HARMONIC EDGE SYNTHESIZER, ENHANCER AND METHODS

(75) Inventor: Edward Callway, Toronto (CA)

(73) Assignee: Broadcom Corporation, Irvine, CA (US)

( * ) Notice: Subject to any disclaimer, the term of this patent is extended or adjusted under 35 U.S.C. 154(b) by 1027 days.

(21) Appl. No.: 11/619,366

(22) Filed: Jan. 3, 2007

(65) Prior Publication Data

US 2007/0152991 A1 Jul. 5, 2007

Related U.S. Application Data

(60) Provisional application No. 60/755,083, filed on Jan. 3, 2006.

(51) Int. Cl.
*G06K 9/48* (2006.01)
(52) U.S. Cl. .......... 382/199; 363/39; 382/266; 455/296; 702/66
(58) Field of Classification Search .................. 330/20, 330/187; 382/199, 266; 702/70, 66; 363/39; 455/296, 302
See application file for complete search history.

(56) References Cited

U.S. PATENT DOCUMENTS

| | | | | |
|---|---|---|---|---|
| 4,044,377 | A * | 8/1977 | Bowerman | 348/136 |
| 5,321,511 | A | 6/1994 | Min | |
| 5,428,398 | A | 6/1995 | Faroudja | |
| 5,805,741 | A | 9/1998 | Shinohara | |
| 6,141,227 | A * | 10/2000 | Sheikh et al. | 363/41 |
| 6,558,328 | B2 * | 5/2003 | Chiao et al. | 600/447 |
| 6,867,659 | B2 * | 3/2005 | Kolsrud | 333/20 |
| 7,130,604 | B1 * | 10/2006 | Wong et al. | 455/302 |
| 7,216,538 | B2 * | 5/2007 | Ito et al. | 73/504.12 |
| 7,277,683 | B2 * | 10/2007 | Dosanjh et al. | 455/209 |
| 7,319,496 | B2 * | 1/2008 | Uchida et al. | 348/625 |
| 7,366,297 | B1 * | 4/2008 | Marshall et al. | 379/413.03 |
| 7,688,473 | B2 * | 3/2010 | Purdum et al. | 358/3.2 |
| 2003/0020642 | A1 * | 1/2003 | Ely et al. | 341/111 |
| 2003/0048717 | A1 * | 3/2003 | Lee et al. | 369/53.18 |
| 2003/0193584 | A1 * | 10/2003 | Malkin et al. | 348/252 |
| 2004/0212448 | A1 | 10/2004 | Kolsrud | |
| 2006/0159283 | A1 * | 7/2006 | Mathew et al. | 381/98 |
| 2008/0169846 | A1 * | 7/2008 | Lan et al. | 327/105 |
| 2009/0030628 | A1 * | 1/2009 | Simpson | 702/70 |

OTHER PUBLICATIONS

Lyons, Richard G., "Understanding Digital Signal Processing", 2004, pp. 167-188, Prentice Hall, 2nd ed. 2004: New Jersey.
European Patent Office, Communication Pursuant to Article 94(3) EPC, in Application No. 07 700 444.8-2218, dated Oct. 22, 2010.
A. Polesel, G. Ramponi, V.J. Mathews, Adaptive Unsharp Masking for Contrast Enhancement, 1997 IEEE, pp. 267-270.
International Search Report, PCT/IB2007/000015, Oct. 16, 2007.
PCT International Preliminary Report on Patentability/Written Opinion, International Application No. PCT/IB2007/000015, Jul. 8, 2008.

* cited by examiner

*Primary Examiner* — Gregory M Desire
(74) *Attorney, Agent, or Firm* — McAndrews, Held & Malloy, Ltd.

(57) ABSTRACT

An edge enhancer for enhancing edges within a video image, forms an edge enhancement signal of odd harmonics of a sinusoid representative of the edge content in an incoming signal. The edge enhancement signal may be added to a version of the incoming signal, thereby sharpening the edge in the incoming signal. This allows edges to be enhanced, increasing the image's rise-time without adding overshoot. Sharper edges are thus produced in much the same way as a square wave may be formed of odd harmonics of a sinusoid.

32 Claims, 6 Drawing Sheets

HARMONIC EDGE SYNTHESIZER, ENHANCER AND METHODS

CROSS-REFERENCE TO RELATED APPLICATION

This application claims benefits from U.S. provisional application Ser. No. 60/755,083 filed Jan. 3, 2006, the entire contents of which are hereby incorporated herein by reference.

FIELD OF THE INVENTION

The present invention relates generally to image processing, and more particularly to enhancing edges in images. The invention is particularly well suited in a video image scaler.

BACKGROUND OF THE INVENTION

Today, television is in the midst of a transformation. Standard television receivers capable of receiving and presenting signals broadcast since the 1940s are being replaced by televisions capable of presenting higher definition signals (so called high definition (HD) signals). HD signals are typically broadcast as digital signals, and currently result in images having resolutions of up to 1920×1080 pixels. This is a vast improvement over conventional standard definition (SD) signals that typically result in images having between 480 and 525 lines, each equivalent to between about 640 to 720 pixels. HD signals thus allow for images having greater image detail and sharpness, allowing for an enhanced viewing experience. As an added benefit, television images may be presented on larger and larger displays.

As many existing television broadcasts are still in SD format, and as many existing programs have been stored and recorded in SD format, newer HD televisions are typically capable of presenting both HD and SD images. SD images are simply enlarged or scaled to fit available space on an HD display.

However, any time an SD image is scaled to HD, a relatively low content signal is converted for presentation into a display format that has more pixels and allows for more rapid image transitions. The scaled SD image is thus far less sharp than a true HD image.

To address deficiencies in scaled SD signals, edge enhancers are often used to enhance edges within the up-scaled image. Good edge enhancement is difficult to achieve, because it simultaneously requires actively speeding up slower edges without causing ringing. Ringing arises because edge-enhancing adds high-frequency components to signals which tend to ring when scaled.

Known edge enhancers add the incoming signal to a differentiated, amplified, and clipped version of this signal. Such enhancers were initially designed to enhance VCR images with frequency responses well below that of broadcast television. Early edge enhancers operated only on the colour (or UV) portion of the signal. The techniques have since been extended to the luminance portion of the signal.

Differentiation, however, inherently emphasizes high frequency noise. Thus, these conventional edge enhancers basically enhance the low frequencies that are already there—they do not really modify the edge and add new high frequencies, except possibly by non-linear clipping. This leads to the "edge around the object" type of sharpness enhancement that is commonly observed on existing TVs.

Further, these edge enhancers often require a circuit which must explicitly decide when an edge is present using a logic circuit. Such decision circuits often fail on complicated source images. Methods which alter the time scale to move the regions before or after an edge are typical of those which require this type of decision. Further, the decision circuits are confused by thin or multiple or close edges. To alleviate this problem, complex and often ineffective circuits may alter how edges are processed in regions of close multiple edges.

Accordingly, there is a need for new edge enhancement techniques and circuits.

SUMMARY OF THE INVENTION

Exemplary of the present invention, an edge enhancer forms an edge enhancement signal of odd harmonics of a sinusoid representative of the edge content in the incoming signal. The edge enhancement signal may be added to a version of the incoming signal, thereby sharpening the edge in the incoming signal. This allows edges to be enhanced, increasing the image's rise-time without adding overshoot. Sharper edges are thus produced in much the same way as a square wave may be formed of odd harmonics of a sinusoid.

The edge enhancer may be combined with an image scaler. A scaled version of the edge enhancement signal including harmonics of the original signal may then be added to a scaled version of the signal. The image to be scaled may be analysed prior to scaling, to calculate an edge enhancement signal based on the frequency content of the image. Conveniently, the edge enhancement signal has relatively low frequency content, and thus may be easily scaled. The scaled edge enhancement signal may then be combined with the scaled version of the original signal.

In accordance with an aspect of the present invention, there is provided a method, comprising: analysing a plurality of adjacent pixels in a pixel stream to determine a sinusoid approximating an edge in the plurality of adjacent pixels; generating an edge enhancement signal including a sum of odd harmonics of the sinusoid.

In accordance with another aspect of the present invention, there is provided a method comprising, storing values representative of a plurality of adjacent pixels in an image; analysing the plurality of adjacent pixels to determine a sinusoid representative of an edge in the plurality of adjacent pixels; generating an edge enhancement signal including a sum of odd harmonics of the sinusoid; combining a representation of at least some of the values and the edge enhancement signal, to form an edge enhanced signal.

In accordance with another aspect of the present invention, there is provided a method comprising, buffering values representative of a plurality of adjacent pixels in an image; analysing the plurality of adjacent pixels; combining at least of some of the values of the plurality of adjacent pixels to form a scaled representation of the plurality of adjacent pixels; generating an edge enhancement signal based on the analysing; combining the scaled representation of the plurality of adjacent pixels and the edge enhancement signal, to form an edge enhanced, scaled signal.

In accordance with yet another aspect of the present invention, there is provided an edge enhancement circuit comprising, a buffer for storing a plurality of adjacent pixels; a filter for determining a sinusoid representative of an edge in the plurality of adjacent pixels; a signal generator for generating an edge enhancement signal including a sum of odd harmonics of the sinusoid.

In accordance with yet another aspect of the present invention, there is provided a method comprising, buffering values representative of a plurality of adjacent pixels in an image; analysing the plurality of adjacent pixels; combining at least of some of the values of the plurality of adjacent pixels to form a scaled representation of the plurality of adjacent pixels; generating an edge enhancement signal based on the analysing; combining the scaled representation of the plurality of adjacent pixels and the edge enhancement signal, to form an edge enhanced, scaled signal.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
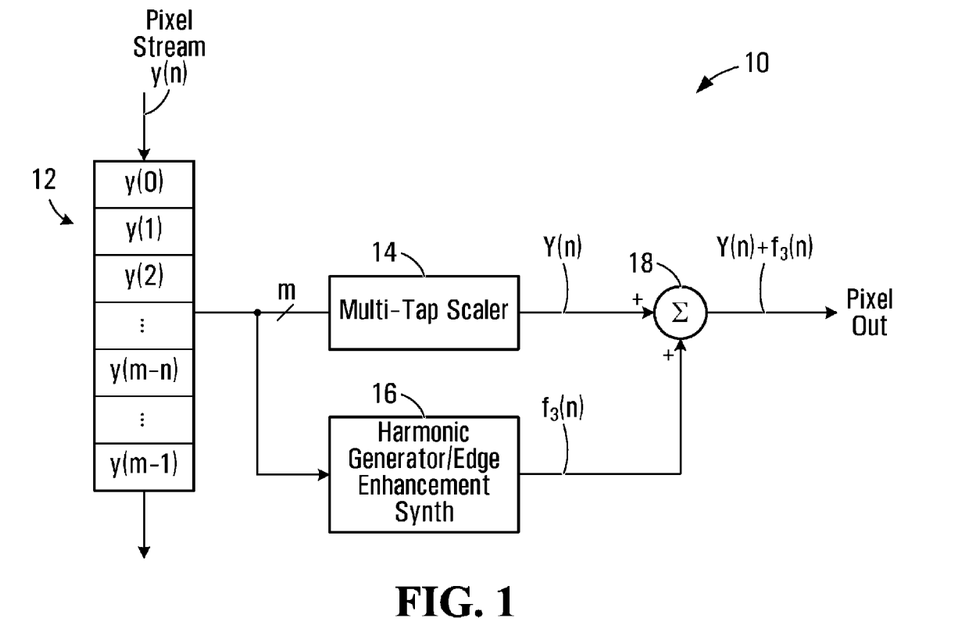
FIG. 1 is a simplified block diagram of a scaler and edge enhancer, exemplary of an embodiment of the present invention.

FIG. 1 is a simplified schematic block diagram of an edge enhancer/scaler 10, exemplary of an embodiment of the present invention. Edge enhancer/scaler 10 may be formed as a portion of an integrated circuit, using conventional integrated circuit design and fabrication techniques. Enhancer/scaler 10 is particularly well suited for use in a video processor, in digital television receiver, a television adapter for a computer, a video decoder, a set-top television or cable receiver, a media player or the like. The video processor may be suitable for use in a computer, television, flat panel monitor, media player (including DVD, PVR or the like), in a camera, or other device requiring the display of digitized images.

As illustrated, edge enhancer/scaler 10 includes a buffer 12 suitable for storing a number of adjacent pixels within a stream of pixels y(n). The pixel values may be values of pixels in RGB colour space, YUV colour space, or a colour or luminance component of the pixels. A multi-tap scaler 14 combines adjacent pixels to form a scaled version, Y(n), of an image represented by the pixel stream y(n). Scaler 14 may be a conventional multi-tap scaler, or may be an adaptive scaler, as for example disclosed in a co-pending application entitled "IMAGE ANALYZER AND ADAPTIVE IMAGE SCALING CIRCUIT AND METHODS", naming Edward Callway as inventor, and filed concurrently herewith.

A multi tap scaler generates scaled pixels by forming a weighted sum of adjacent pixels in the image. In the depicted embodiment, an m tap scaler is used. That is a scaled pixel Y(j) is formed of the weighted sum of m adjacent pixels, $$Y(j) = 1/m \sum_{i=0}^{m-1} S_i * y(i+j)$$

where $S_i$ are scaling coefficients.

For each m pixels received in buffer 12, muti-tap scaler 14 generates one or more output pixels. If scaler 14 is to up-scale an image, scaler 14 outputs M>N pixels, for each N pixels entering buffer 12. As required, the m scaling coefficients $S_i$ may be updated for each output pixel. Suitable sets of scaling coefficients may be stored in memory (not shown).

Similarly, if scaler 14 downscales an image, scaler 14 outputs M<N pixels, for each N pixels entering buffer 12. Again, the m scaling coefficients $S_i$ may be updated for each output pixel.

Scaler 14 may thus be clocked at a rate proportional to (i.e. M:N times the rate) the arriving pixel stream.

Enhancer/scaler 10 can thus be used to scale a two dimensional image vertically or horizontally, by providing a pixel stream arranged in columns or rows to enhancer/scaler 10. If an image is to be scaled both vertically and horizontally, two separate enhancers/scalers may be used.

An edge synthesizer 16 analyzes the incoming pixels to determine their frequency content, and generate an edge enhancement signal. As will become apparent, synthesizer 16, analyses the incoming stream m pixels at a time, to form a harmonic enhancement function that in turn is used to produce an enhancement value that may be used to enhance an edge in the scaled version of the pixels. The edge enhancement signal is formed of odd harmonics of the frequency content of an edge in the group of adjacent pixels. Although m pixels are used by synthesizer 16, the number of pixels used to analyse and form the edge enhancement signal may be different than the number of pixels that are combined by scaler 14. That is, scaler 14 could use $m_1$ taps, while synthesizer 16 could analyse $m_2$ pixels.

Synthesizer 16 operates on the premise that an edge within the signal may be modelled as a sinusoid, and that sharp edges can be generated as the sum of odd harmonics of that sinusoid. As will be apparent, as used herein, a sum of harmonics refers to a weighted sum of the harmonics. Thus, exemplary synthesizer 16 forms a sinusoid representative of the edge of interest. As will become apparent, synthesizer 16 forms a sinusoid, by band-pass filtering the signal including the edge of interest. The band-pass filter has a sinusoidal impulse response. In this way, synthesizer 16 creates a sinusoid having a frequency equal to the frequency of the sinusoid modelling the edge of interest. In the depicted embodiment, synthesizer 16 may then use the idea of Fourier square wave synthesis as a basis for forming an edge enhancement signal. However, different amplitudes of the harmonics may be used to produce a sharper edge with only two or three odd harmonics.

Once the edge enhancement signal has been generated, adder 18 adds the generated edge enhancement signal to the scaled output of scaler 14. Specifically, adder 18 adds the value of the generated edge enhancement signal to pixels in the scaled image.

In the depicted embodiment, the following trigonometric observations are combined to generate the harmonic enhancement value:

$$\sin(3x) = \sin(x) * (-1 + 4*\cos^2(x))$$

$$\sin(5x) = \sin(x) * (1 - 12*\cos^2(x) + 16*\cos^4(x))$$

$$\sin(7x) = \sin(x) * (-1 + 24*\cos^2(x) - 80*\cos^4(x) + 64*\cos^6(x))$$

$$H^2 = (H\sin)^2(x) + (H\cos)^2(x)$$

Assuming that an edge of interest in the m buffered pixels in the stream y(n) may be approximated by a sinusoid of frequency $\omega/2\pi$, an edge enhancement signal may take the form, $$f_1(n)=G*((A-1)*\sin(\omega n)+B*\sin(3\omega n)+C*\sin(5\omega n)+D*\sin(7\omega n))$$

$$f_2(n)=G*\sin(\omega n)*(K+L*\cos^2(\omega n)+N*\cos^4(\omega n)+Q*\cos^6(\omega n)).$$

Conveniently, $f_2(n)$ is a trigonemtric equivalent (or approximation) of $f_1(n)$ using only functions of $\omega$ and not functions of harmonics of $\omega$ (i.e. $2\omega$, $3\omega$, etc.).

Further, $\sin(\omega n)$ and $\cos(\omega n)$ representative of the edge, may be approximated from the m pixels in the pixel stream y(n) by band-pass filtering the adjacent pixels in the stream. That is, $H\sin(\omega n)\approx F(y(n))$=a band-pass filtered version of the source y(n) with no phase shift, and $H\cos(\omega n)\approx F(y(n))$=a band-pass filtered version of the source $y(n)$ with a 90° shift By choosing the nature of the band-pass filters, and more specifically its center frequency, and pass-band, an appropriate filter may detect edges having a desired slope, approximated by sinusoids in this frequency range.

Figure 2:
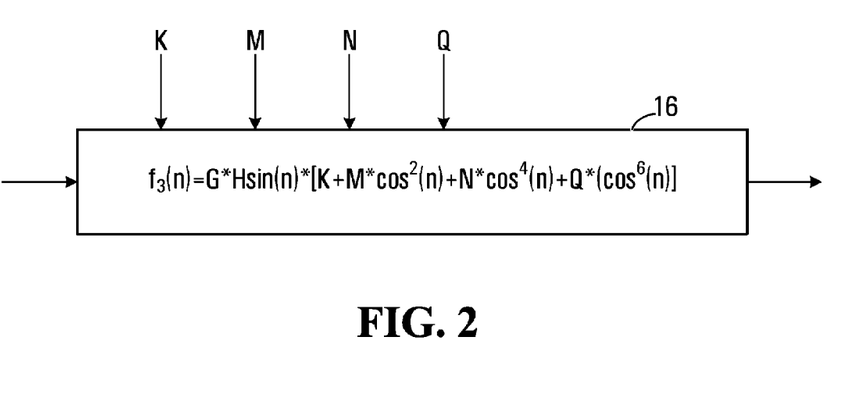
FIG. 2 is a block diagram of an edge synthesizer of scaler and edge enhancer FIG. 1.

Once the edge has been approximated as a sinusoid, synthesizer 16 derives an edge enhancement function $f_3$ from m pixels in the incoming pixel stream y(n), as depicted in FIG. 2:

$$f_3(n)=G*H\sin(\omega n)*(K+L*((H\cos)^2(\omega n)/H^2)+N*((H\cos)^2(\omega n)/H^2)^2+Q*((H\cos)^2(\omega n)/H^2)^3)$$

Values K, L, N, and Q may be stored in programmable registers.

Figure 3A:
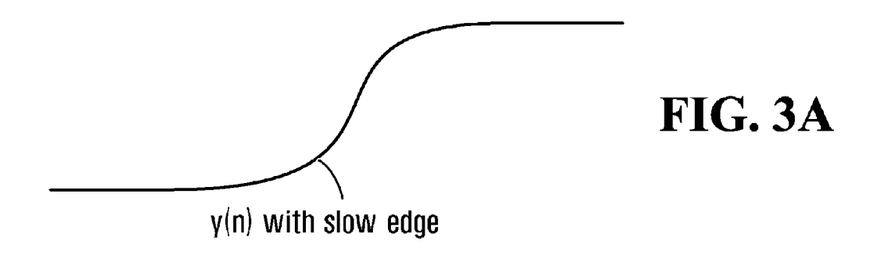
FIGS. 3A-3D depict the addition of odd harmonics to enhance an edge.
Figure 3B:
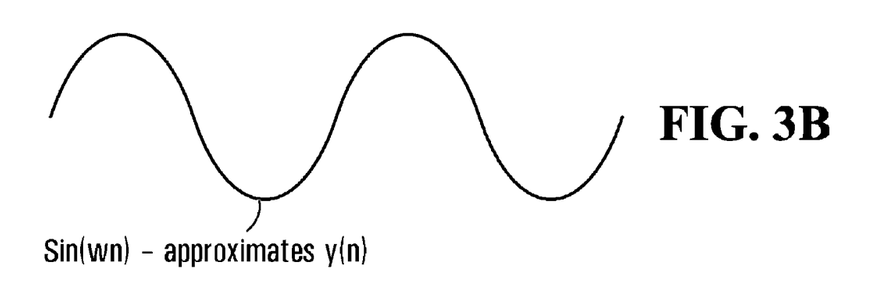
Figure 3C:
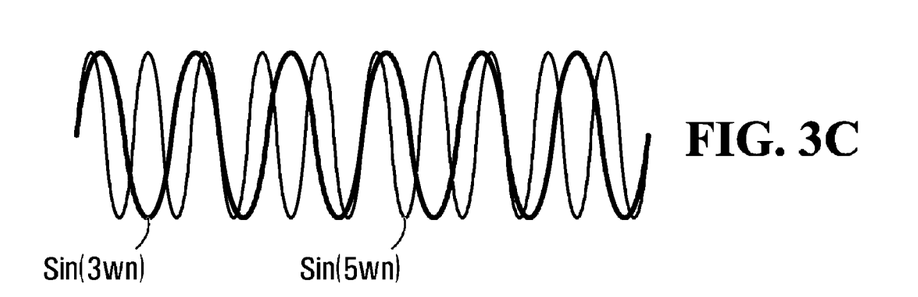
Figure 3D:
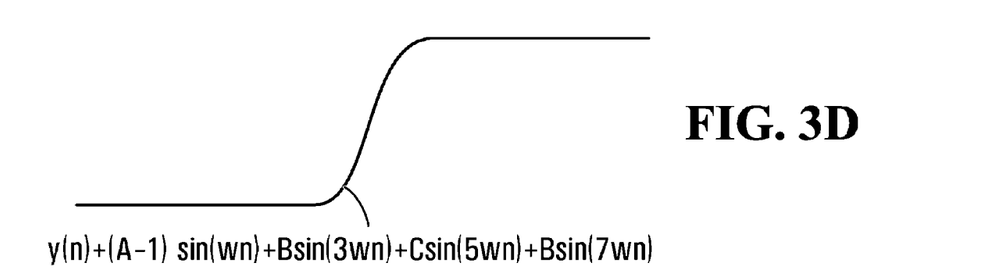

For illustration, the values of a series of m pixels y(n) having a slow edge, are depicted in FIG. 3A, and may be approximated as a sinusoid (e.g. sine wave) depicted in FIG. 3B. Odd harmonics of the sinusoid may then be calculated as in FIG. 3C. Without scaling, the weighted sum of odd harmonics and the original signal y(n) results in an edge enhanced signal, as depicted in FIG. 3D.

Figure 4:
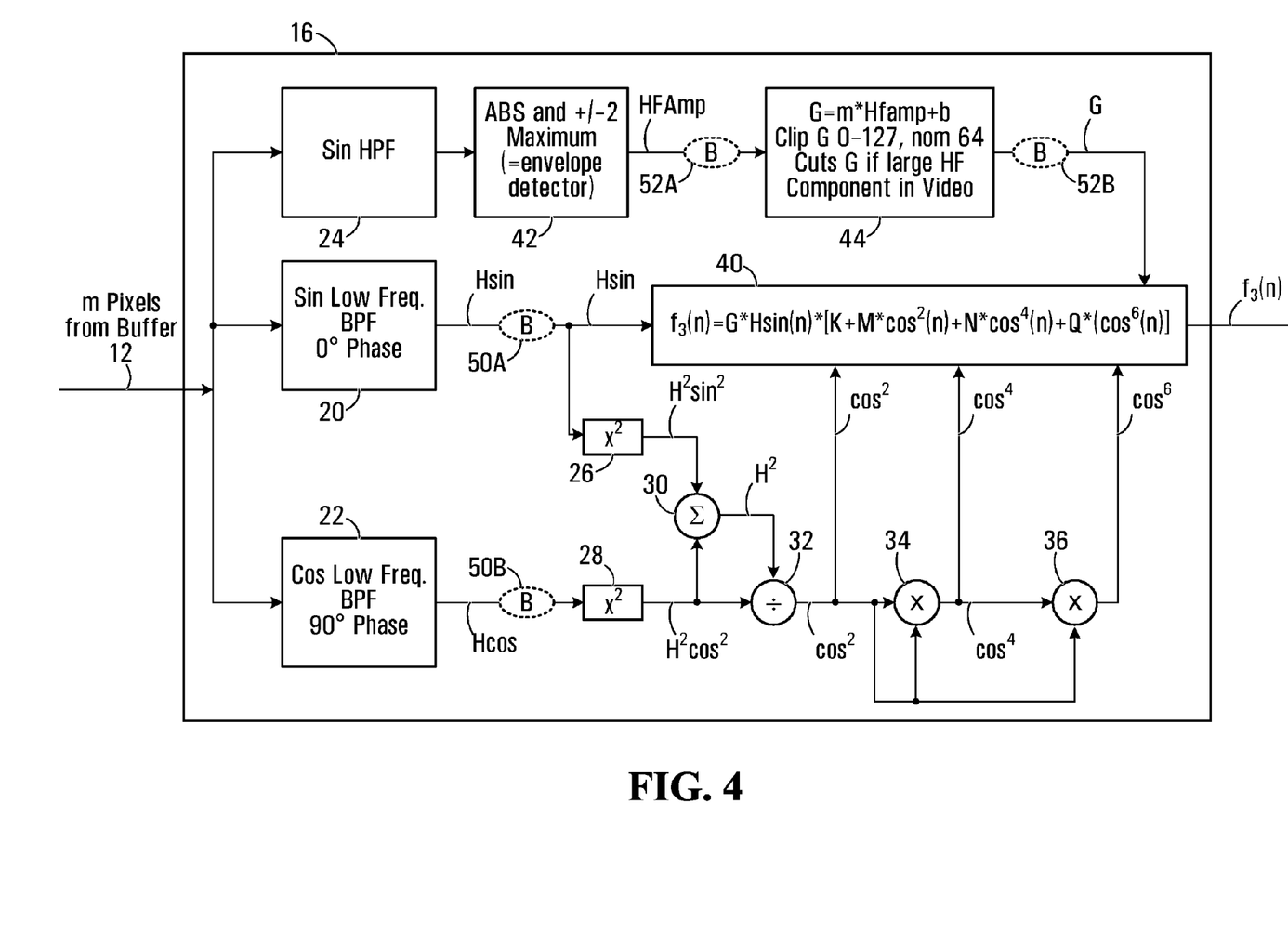
FIG. 4 is further block diagram of edge synthesizer of the scaler and edge enhancer of FIG. 1.

A further simplified block diagram of edge synthesizer 16 is depicted in FIG. 4.

Synthesizer 16 re-calculates the parameters of the enhancement function $f_3(n)$ for each new pixel in buffer 12, using m adjacent pixels in buffer 12.

The trigonometric identities above use sine and cosine terms with an amplitude of one (1). For most manipulations, amplitude is not a concern. Of course, a real signal typically has a non-unity amplitude. So, equation $f_2(x)$ is only an approximation for a real video signal.

Viewed as a Fourier series, the source y(n) is made up of a sum of many signals of differing frequencies, amplitudes, and phases. Narrow bandpass filters 20, 22 may be used to produce two narrow band quadrature signals that may be viewed as $H\sin(\omega n)$ and $H\cos(\omega n)$. [In fact, for a time varying signal, H is really H(t), a varying signal].

Specifically, as illustrated, pixel values stored in buffer 12 are provided to band-pass sine filter 20, and band-pass cosine filter 22. Filters 20 and 22 are band-pass filters, having appropriately chosen center and pass-band frequencies. They may be formed as FIR filters. Further, filters 20 and 22 have sine and cosine impulse response. As such, filters 20, 22 perform low frequency spectral analysis of the m pixels in buffer 12 and act as quadrature band-pass filters and only pass those components of the signal y(n) with frequencies at 0-50% of the sampling frequency of the pixels (i.e. the Nyquist frequency). Filters 20, 22 further generate a sine and cosine function, respectively, having a frequency corresponding to the frequency of the m pixels of pixel stream y(n). A suitable sine filter 20 and cosine filter 22 will be apparent to those of ordinary skill. For example, a representative sine filter could be formed as a FIR filter having coefficients {−0.25, 0, 0.5, 0, −0.25}. A representative cosine filter could be formed as a FIR filter having coefficients {0, 0.5, 0, −0.5, 0}.

Alternative band-pass filters useable as filters 20 and 22 are detailed in Richard G. Lyons, Understanding Digital Signal Processing (Prentice Hall, 2ed, 2004).

Synthesizer 16 thus forms $$f_3(n)=G*H\sin(\omega n)*(K+L*((H\cos)^2(\omega n)/H^2)+N*((H\cos)^2(\omega n)/H^2)^2+Q*((H\cos)^2(\omega n)/H^2)^3)$$

$H\sin(\omega n)$ term is easily obtained, as it appears naturally as the source signal y(n) is filtered using filter 20. Deriving $\cos^2$ is slightly less straight forward. H cannot easily be separated from H cos, as in equation $f_2(n)$. However, $\cos^2(\omega n)$ may be derived from $(H\cos)^2(\omega n)$ divided by $H^2$. $H^2$ is easily obtained as, $H^2=(H\sin)^2(\omega n)+(H\cos)^2(wn)$. As $(H\cos)^2(\omega n)$ is already required, so only $(H\sin)^2(\omega n)$ has to be generated with a multiply. Conveniently, H does not to be explicitly calculated—$H^2$ may be calculated for the cosine terms.

As a result, one divide operation is used is used in synthesizer 16. Of course, the minimum value of $H^2$ should be limited so that very small noise signals do not get amplified into false edges.

The term G controls the gain of the enhancement signal—when G=0 no enhancement signal is output by synthesizer 16. B, C, D in $f_1$ control the weight of the harmonics, and may be programmable to allow fine tuning the shape of the enhancement signal. A may be viewed as simply a boost/cut control at the centre frequency of the filter.

Edge synthesizer 16 controls the values A, B, C, and D by way of K, L, N and Q stored values stored in programmable registers. The actual register values K, L, N and Q are easily derived from A, B, C, D, as follows:

$$\begin{aligned}f(x) &= G*((A-1)*\sin(x)+B*(\sin(x)*(-1+4*\cos^2(x)))+\\&\quad C*(\sin(x)*(1-12*\cos^2(x)+16*\cos^4(x)))+D*(\sin(x)*\\&\quad (-1+24*\cos^2(x)-80*\cos^4(x)+64*\cos^6(x))))\\&= G*((A-1)*\sin(x)-B*\sin(x)+B*\sin(x)*4*\cos^2(x)+\\&\quad C*\sin(x)-C*\sin(x)*12*\cos^2(x)+C*\sin(x)*16*\\&\quad \cos^4(x)-D*\sin(x)+D*\sin(x)*24*\cos^2(x)-\\&\quad D*\sin(x)*80*\cos^4(x)+D*\sin(x)*64*\cos^6(x))\\&= G*(((A-1)-B+C-D)*\sin(x)+\\&\quad (B-3C+6D)*\sin(x)*\\&\quad 4*\cos^2(x)+(4C-20D)*\sin(x)*4*\cos^4(x)+\\&\quad (16D)*\sin(x)*4*\cos^6(x))\\&= G*\sin(x)*(((A-1)-B+C-D)+(4B-12C+24D)*\\&\quad \cos^2(x)+(16C-80D)*\cos^4(x)+(64D)*\cos^6(x))\end{aligned}$$

Thus, $K=((A-1)-B+C-D)$ $L=(4B-12C+24D)$ $N=(16C-80D)$ $Q=64D$

Programmable registers (not shown) storing values K, L, N and Q may form part of enhancer/scaler 10 and be programmed under software control. Values K, L, N and Q qualitatively control the edge enhancement/synthesis of enhancer/scaler 10. They typically are not reprogrammed, and remain constant for sequential sets of adjacent sixteen pixels.

As noted, edge synthesizer 16 generates one edge synthesis function $f_3(n)$ for every m pixels in y(n), and one enhancement value for these m pixels. In order to align the generated edge enhancement value with the m incoming pixels (or scaled versions thereof), the output of edge synthesizer 16 may need to be delayed to generate $f_3(n)$ for any m adjacent pixels. In the depicted embodiment, an edge enhancement value is most representative at the center of the plurality of pixels in buffer 12. Thus, for a 15 tap cosine filter, edge synthesizer 16 may generate an edge enhancement value, best used to enhance the $8^{th}$ pixel in buffer 12.

Five pixels about the center pixel in buffer 12 are also passed from buffer 12 through a high pass filter 24. High pass filter 24 performs a high frequency spectral analysis of the block of m pixels in buffer 12, by detecting the portion of the buffered pixel signal that is high frequency. The greater the proportion of the block of m pixels in buffer 12 that has a high frequency (e.g. between 75-100% of Nyquist), the less edge enhancement the lower frequency part of the block will be subjected. A suitable high pass filter 24 may have transfer function apparent to those of ordinary skill, and may for example be formed as a three-tap FIR filter having coefficients {−0.5, 1, −0.5}.

Conventional squaring blocks 26, 28, multipliers 34, 36, summer 30 and divider 32 are arranged to combine the outputs H sin(n) and H cos(n) of low pass filter 20 and 22, to produce H $sin(n)*(K+L*cos^2(n)+N*cos^4(n)+Q \; cos^6(n))$ to produce signal generation block 40, as illustrated in FIG. 4.

The output of high pass filter 24, G, controls the gain of the edge enhancement that takes place with the lower frequency part of the signal. G is included in the equation for $f_3(n)$ above. G thus controls the intensity of the edge enhancement and limits edge enhancement if the signal has significant high frequency components.

FIG. 4 further illustrates where relatively simple scalers "B" 52a (or 52b), 50a and 50b may be included as part of synthesizer 16. Conveniently, outputs of the filters 20, 22, and envelope detector 42 (the sin and cos filtered signals, and the envelope of the high frequency amplitude signal HFAmp, or the gain signal G) are all low pass signals and can be scaled with lower order (i.e. fewer tap) and cheaper filters than the main pixel stream y(n). In the depicted embodiment, scalers 52a (or 52b) and scalers 50a and 50b can take the form of bilinear scalers, and may include suitable delay blocks for storing two sequential outputs of envelope detector 42 and filters 20 and 22. Of course, scalers 50a, 50b and 52a (or 52b) may be higher order scalers. Similarly, scaling coefficients may be stored in memory (not shown), and the bilinear scalers 52a (52b), 50a and 50b may be clocked at a rate consistent with scaler 14 (i.e. at a rate proportional to M:N the rate of arriving pixel stream). The resulting scaled signal at the output of scalers 52a (52b), 50a and 50b is scaled to a size consistent with the scaled signal Y(n), but may still have frequency content less than the Nyquist sampling frequency of the original pixel stream. Moreover, even if the main signal y(n) can only adequately be scaled with a ten tap or higher filter, the analysis signals may be scaled with as little as a two tap bilinear filter.

As edge enhancement synthesizer 16 only processes low frequency portions of the signal y(n), two parallel processing paths are used—one (including filters 20 and 22) for low frequency parts of the signal that require edge enhancement, and one (including filter 24) for the rest of the signal (the higher frequency parts) for which edges should be left alone and not sped up. Thus, the signals generated by filters 20, 22 and envelope detector 42 are band-pass or low pass filtered analysis signals. The band-pass/low-pass filtered analysis signals are then scaled by scalers 50a, 50b and 52a and 52b.

Unlike conventional edge enhancers, edge enhancer 16 does not include a differentiator, edge detector or threshold detector. Instead three enhancement/analysis signals are derived from the input stream: H sin, H cos, and G. By band-pass filtering the input stream, only slow edges with a slope of interest within the pass-band of the band-pass filters 20, 22 are enhanced. The envelope of the high pass filter 24 controls the gain.

Figure 5A:
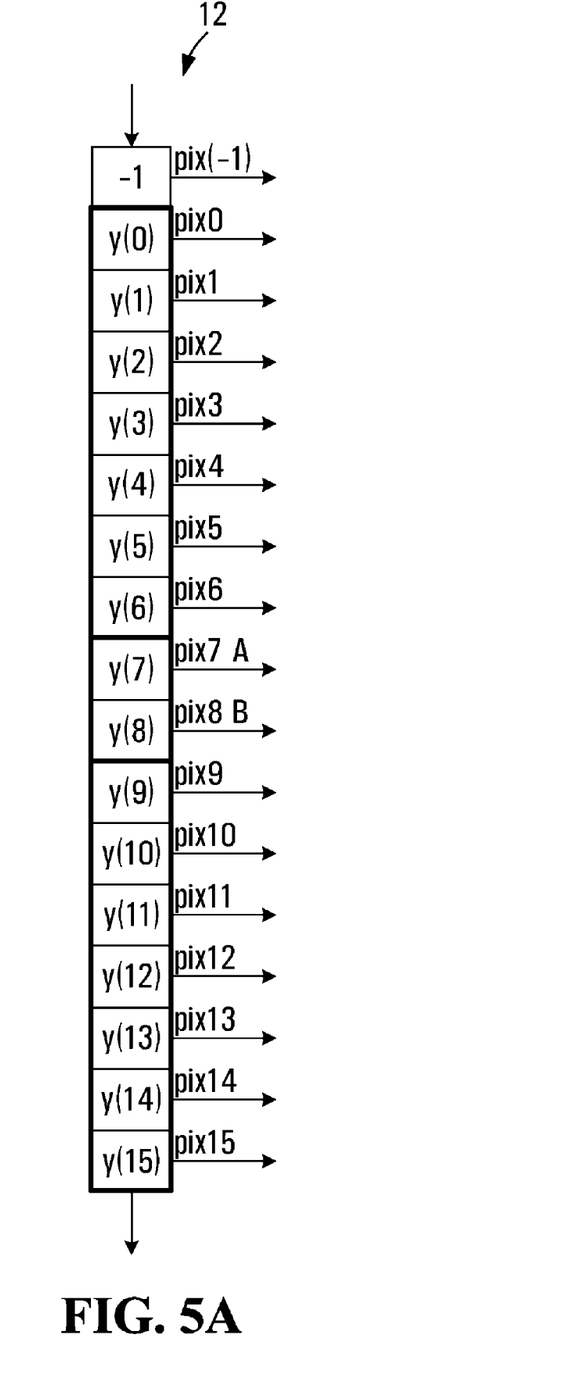
FIGS. 5A-5D are block diagrams of various component of the edge synthesizer FIG. 4.

Buffer 12 may be formed as a conventional m storage location shift register, as depicted in FIG. 5A. Incoming pixels are stored as depicted. As the next pixel arrives, pixels are shifted right, and the oldest pixel is shifted out of buffer 12. As noted, the current m pixels in buffer 12 are analysed and serve as a basis for calculating the filtered values H sin, and H cos.

Figure 5B:
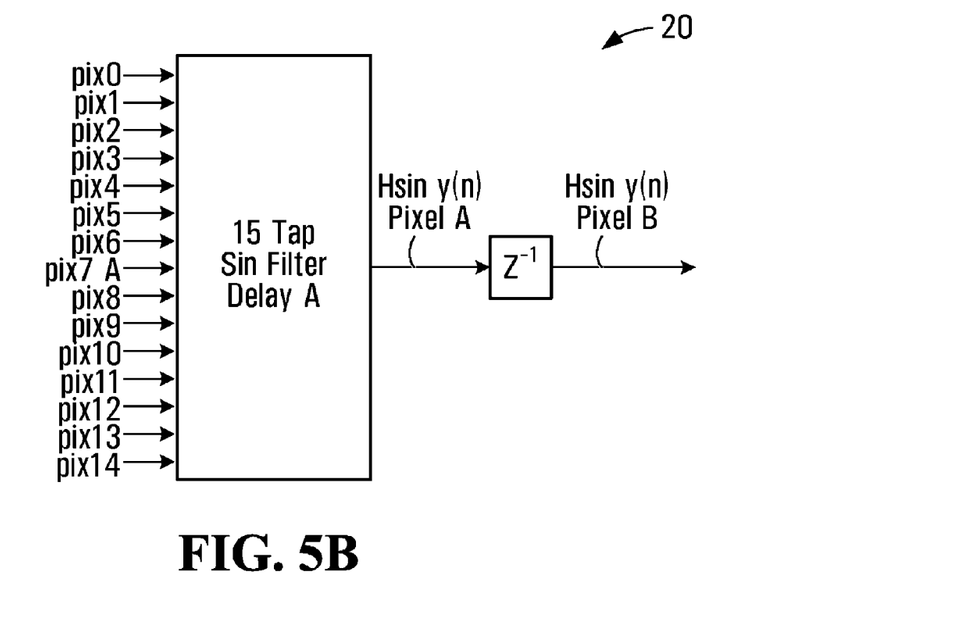
Figure 5C:
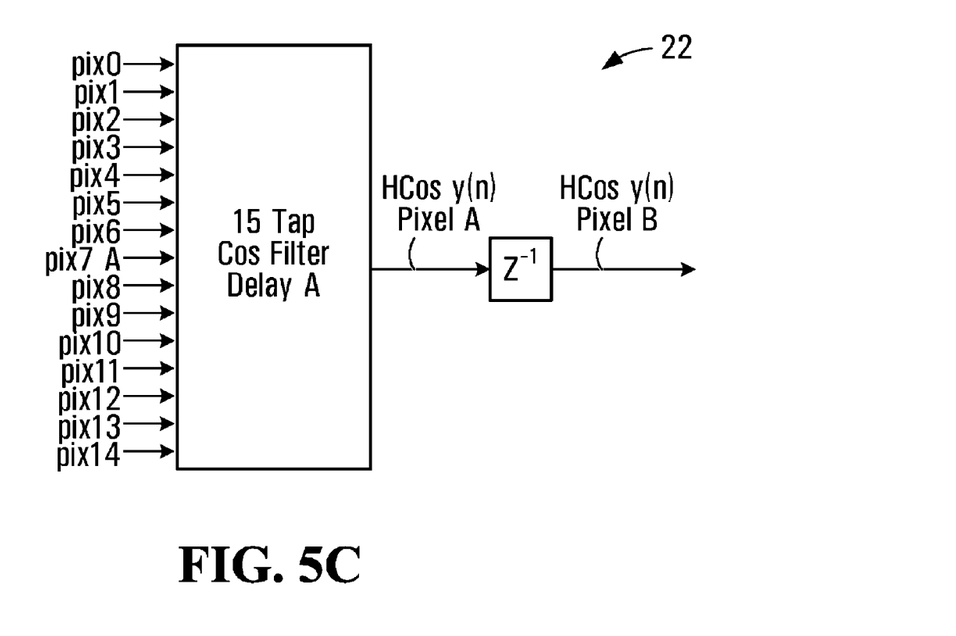

The H sin term may be produced with a conventional band-pass FIR of the type [ . . . a, b, c, b, a . . . ]. That is the FIR may be mirrored, odd length, with no phase shift, as depicted in FIG. 5B. The H cos term may be produced with a conventional multi-tap band-pass FIR of the type [ . . . d, e, 0, −e, −d . . . ] i.e. mirrored, odd length, broadband 900 phase shift, as depicted in FIG. 5C. Suitable FIR filters are detailed in Understanding Digital Signal Processing, supra.

The frequency response of the H sin and H cos should be well matched in the pass-band. For standard definition video signals sampled at 13.5 Mhz, they may be derived by noting that edges with frequencies in the 0.5 to 2 MHz region should be boosted. Those above and below need not be enhanced. Optionally, filter coefficients may be programmable, so that these can be tuned and other edge rates may be enhanced. Similarly, with other coefficients, other edge rates could be enhanced for other signal types.

Conveniently, sin and cos filters 20, and 22 are relatively short while still meeting the basic frequency response goals. This limits the edge enhancement from spreading past the edge.

A delay block used in scalers 52a and 52b is further illustrated in each of FIGS. 5B and 5C.

Figure 5D:
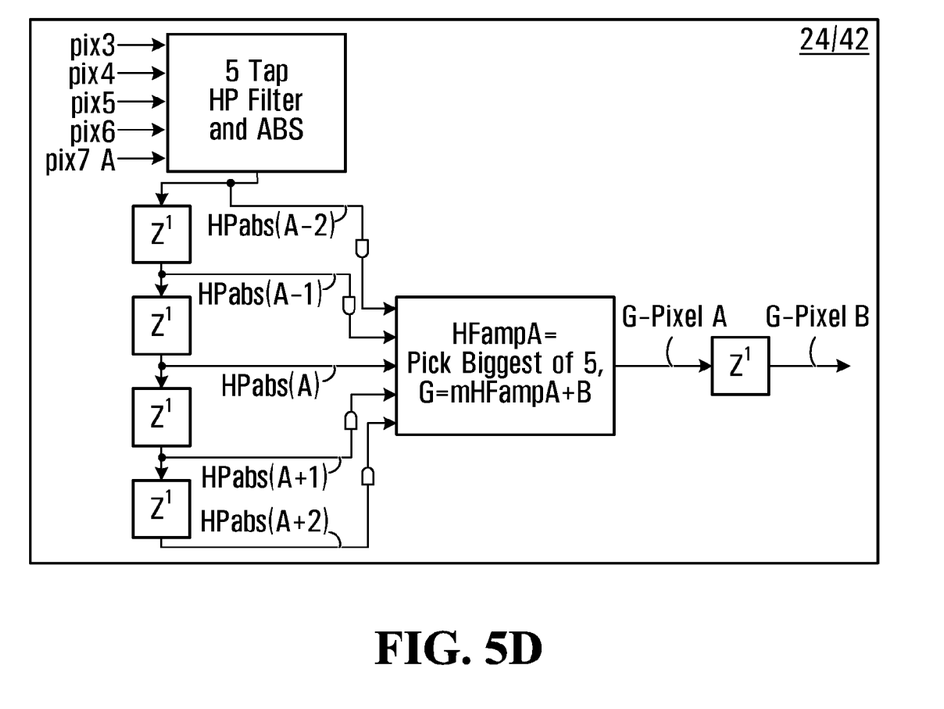

An example high-pass filter 24 is schematically depicted in FIG. 5D. As illustrated, high pass filter 24 and envelope detector 42 includes a five tap filter that is provided five pixels within a block in buffer 12. Again, to align the value of G with the input stream, five pixels of interest about the center pixel within buffer 12 are used for analysis. Four cascaded delay elements generate delayed versions of the signal, and the largest is chosen, in order dampen response of filter 24.

Once $f_3$ is formed, it may then be added by adder 18 to the scaled version of pixels in buffer 12, as produced by scaler 14. This results in sped up edges at around the frequencies of the Fourier harmonics.

For vertical scaling, filters 20 and 22 may be shorter (e.g. only 5 taps long), as fewer lines are typically available. The boost is shifted up to midband as a result. This is not unreasonable because pixels in a column have few natural low pass components, unlike pixels in a line.

Harmonics used by synthesizer 16 are easily extensible: To drop the $7^{th}$ harmonic, D=0, which will remove the Q and $cos^6(x)$ terms entirely. To add the $9^{th}$ harmonic, synthesizer 16 could be modified to add an $R*cos^8(x)$ term. A person of ordinary skill will readily appreciate how to otherwise extend or modify the function $f_3$ used in synthesizer 16.

If no scaling is required, as for example in an analog CRT TV, an edge enhancer like synthesizer 16 may be placed anywhere in the signal path with adequate bandwidth to handle the increased frequency content.

As should now be appreciated, placement of an edge enhancer in a digital video system creates numerous challenges.

Specifically, if edge enhancement is performed prior to scaling an image, harmonics of an input signal near and past the Nyquist frequency limit for the signal must be determined. The result is that the frequency of the enhancement signal entering the scalar may be placed outside of the Nyquist limit. This may cause artifacts, such as aliasing, ringing, or loss of edge enhancement or definition after passing through a video scaler.

If the edge enhancement is performed after scaling the image, the signal used for enhancement might only be at 15-20% of the Nyquist frequency. Since edge enhancing involves looking at the lower frequency components of a given signal, only 5% of the near Nyquist signal may be available. Analysing a signal at only 5% of Nyquist requires significant sampling and therefore a long and costly filter. In addition, as the scaling ratio changes frequently depending on the source content or user zoom requirements, the filter coefficients would have to be recalculated in real time, or many filters would have to stored in advance. This is also costly.

Conveniently synthesizer 16 allows edge enhancement using odd harmonics while performing the analysis on the original signal prior to scaling, without generating signals outside the Nyquist limit. This is facilitated by analysing the original signal y(n), without edge enhancing, to form an analysis signal having at least one low pass (or band pass) signal. The analysis signal may then be scaled and used to synthesize high frequency components used to form an edge enhancement signal. The original signal and the scaled, edge enhancement signal may be combined. That is, the edge enhancer/scaler 10 analyzes the signal prior to scaling (i.e., while the relevant slow signal y(n) is typically at <30% of Nyquist, which lets us work with a much shorter filter). Once the signal has been analyzed and calculations are made to yield signal components that result in sharper edges, using a scaled edge enhancement signal that is scaled prior to the addition of those edge sharpening components.

As should now be apparent, although enhancer/scaler 10 has been depicted as a hardware circuit, an equivalent enhancer/scaler could easily be formed in software, firmware, or the like.

In an alternate embodiment, an enhancer/scaler like enhancer/scaler 10 could be formed using multiple edge enhancement synthesizers, like synthesizer 16, but each having filters tuned to edges of different frequencies. Each such synthesizer may then independently, like synthesizer 16. The output of the multiple synthesizer may then be summed with the output of a multi-tap scaler, like scaler 14, in order to form an edge enhanced signal having edges of multiple slopes enhanced.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method, comprising:
   first generating a scaled output using a plurality of adjacent pixels of a video image, said first generating performed by one or more circuits;
   analysing said plurality of adjacent pixels in a pixel stream to determine a sinusoid approximating an edge in said plurality of adjacent pixels by said one or more circuits;
   second generating an edge enhancement signal by said one or more circuits based on said analyzing, said edge enhancement signal including a sum of odd harmonics of said sinusoid; and
   adding said scaled output and said edge enhancement signal by said one or more circuits.

2. The method of claim 1, wherein said analysing comprises band-pass filtering said plurality of adjacent pixels to form at least one band-pass filtered analysis signal.

3. The method of claim 2, wherein said band-pass filtering forms a sinusoid of the form H sin(ωn) having a frequency approximating said edge.

4. The method of claim 3, wherein said band-pass filtering forms a sinusoid of the form H cos(ωn) having a frequency approximating said edge.

5. The method of claim 4, wherein said edge enhancement signal is formed by forming a signal of the form, $$(L^*((\cos)^2(\omega n)) + N^*(\cos)^4(\omega n)) + Q^*((\cos)^6(\omega n)).$$

6. The method of claim 5, wherein said signal of the form $$(L^*((\cos)^2(\omega n)) + N^*(\cos)^4(\omega n)) + Q^*((\cos)^6(107\,n))$$

is formed from a signal having the form, $$L^*((H\cos)^2(\omega n)/H^2) + N^*((H\cos)^2(\omega n)/H^2)^2 + Q^*((H\cos)^2(\omega n)/H^2)^3).$$

7. The method of claim 2, further comprising repeating said analysing and said generating for each pixel within said pixel stream, using m adjacent pixels in said pixel stream.

8. The method of claim 7, further comprising scaling said pixel stream by a ratio of M:N and further comprising scaling said band-pass filtered analysis signal by a ratio of M:N.

9. The method of claim 8, wherein said scaling said pixel stream is performed with a scaler having more taps than a scaler used to scale said band-pass filtered analysis signal.

10. The method of claim 1, wherein said edge enhancement signal contains the third and fifth harmonics of said sinusoid.

11. The method of claim 10, wherein said edge enhancement signal further contains the seventh harmonic of said sinusoid.

12. The method of claim 11, wherein said edge enhancement signal further contains the ninth harmonic of said sinusoid.

13. The method of claim 1, wherein said scaled output is generated using a weighted sum of said plurality of adjacent pixels.

14. The method of claim 1, wherein said analysing further comprises determining a measure of high frequency content in said plurality of adjacent pixels, and controlling an amplitude of said edge enhancement signal in dependence on said measure of high frequency content.

15. The method of claim 14, wherein said determining a measure of high frequency content comprises high pass filtering said plurality of adjacent pixels.

16. The method of claim 1, wherein said plurality of adjacent pixels comprises sixteen adjacent pixels.

17. The method of claim 1, wherein said pixel stream represents adjacent pixels in a line of said video image.

18. The method of claim 1, wherein said pixel stream represents adjacent pixels in a column of said video image.

19. A method comprising,
   storing values representative of a plurality of adjacent pixels in an image into a buffer;

analysing said plurality of adjacent pixels of a video image to determine a sinusoid representation of an edge in said plurality of adjacent pixels;

generating an edge enhancement signal based on said analyzing, said edge enhancement signal including a sum of odd harmonics of said sinusoid;

combining a representation of at least some of said values and said edge enhancement signal, to form an edge enhanced signal, said analyzing, generating, and combining performed by one or more circuits.

20. The method of claim 19, wherein said analysing results in an analysis signal, and further comprising, combining at least some of said values of said plurality of adjacent pixels to form said representation of said at least some of said values;

scaling said analysis signal to form said edge enhancement signal.

21. A method comprising, buffering a plurality of values corresponding to a plurality of adjacent pixels of an image;

first combining at least some of said values of said plurality of values to form a scaled representation of said plurality of adjacent pixels;

generating an edge enhancement signal based on using odd harmonics of a frequency content of said plurality of adjacent pixels; and second combining said scaled representation of said plurality of adjacent pixels and said edge enhancement signal, wherein said buffering, first combining, generating, and second combining is performed in one or more circuits of an integrated circuit to form an edge enhanced, scaled signal.

22. The method of claim 21, wherein said combining comprises computing a weighted sum of said plurality of values.

23. A video processor comprising, a buffer for storing a plurality of values wherein each of said values corresponds to each of a plurality of adjacent pixels;

a filter for determining a sinusoid representation of an edge in said plurality of adjacent pixels;

a signal generator for generating an edge enhancement signal including a sum of odd harmonics of said sinusoid.

24. The edge enhancement circuit of claim 23, wherein said filter comprises a band-pass FIR filter of the type [ . . . a, b, c, b, a . . . ].

25. The edge enhancement circuit of claim 24, wherein said filter further comprises a band-pass FIR filter of the type [ . . . d, e, 0, −e, −d . . . ].

26. The edge enhancement circuit of claim 24, further comprising a second filter for determining a measure of high frequency in said plurality of adjacent pixels.

27. The edge enhancement circuit of claim 23, further comprising a scaler for scaling an output of said filter.

28. The edge enhancement circuit of claim 23, wherein said signal generator produces a signal of the form, $$G*\sin(\omega n)*(K+(L((\cos)^2(\omega n))+N*(\cos)^4(\omega n)+Q*((\cos)^6((\omega n))),$$

where K, L, N and Q are stored constants, G is a gain factor, and ω is representative of the frequency of said edge in said plurality of pixels.

29. A method comprising, buffering values representative of a plurality of adjacent pixels in an image;

generating an edge enhancement signal using a first subset of said values;

forming a scaled representation of said plurality of adjacent pixels by combining a second subset of said values; and combining said scaled representation and a representation of said edge enhancement signal, to form an edge enhanced, scaled signal, said buffering, generating, forming, and combining performed by one or more circuits.

30. The method of claim 29, further comprising band-pass filtering said values to form a band-pass filtered analysis signal, and scaling said band-pass filtered analysis signal to form said edge enhancement signal.

31. The method of claim 30, wherein said forming a scaled representation of said plurality of adjacent pixels is formed using a scaler having more taps than a scaler used to form said edge enhancement signal.

32. The method of claim 29, wherein said edge enhancement signal is formed from said band-pass filtered analysis signal using at least one bilinear scaler.

* * * * *